United States Patent
Bartholomew et al.

(10) Patent No.: US 6,202,209 B1
(45) Date of Patent: *Mar. 13, 2001

(54) PERSONAL INFORMATION DEVICE AND METHOD FOR DOWNLOADING REPROGRAMMING DATA FROM A COMPUTER TO THE PERSONAL INFORMATION DEVICE VIA THE PCMCIA PORT OR THROUGH A DOCKING STATION WITH BAUD RATE CONVERSION MEANS

(75) Inventors: Paul R. Bartholomew, Eastampton; Mark M. Todorovich, Medford Lakes, both of NJ (US)

(73) Assignee: Xircom, Inc., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/368,878

(22) Filed: Aug. 5, 1999

Related U.S. Application Data

(63) Continuation-in-part of application No. 09/189,572, filed on Nov. 11, 1998, which is a continuation-in-part of application No. 09/028,367, filed on Feb. 24, 1998, now Pat. No. 5,978,591.

(51) Int. Cl.[7] .................................................. G06F 9/445
(52) U.S. Cl. .............................. 717/11; 710/129; 375/220
(58) Field of Search .............................. 717/11; 710/129; 235/492; 455/186.1; 375/220

(56) References Cited

U.S. PATENT DOCUMENTS

| | | | |
|---|---|---|---|
| 5,423,086 | 6/1995 | Cannon et al. | 455/186.1 |
| 5,537,558 | * 7/1996 | Fletcher et al. | 710/129 |
| 5,787,282 | * 7/1998 | Tanaka et al. | 395/701 |
| 5,815,722 | * 9/1998 | Kalwitz et al. | 395/712 |
| 5,889,816 | 3/1999 | Agrawal et al. | 375/220 |
| 5,953,541 | * 9/1999 | King et al. | 710/67 |
| 5,978,591 | * 11/1999 | Bartholomew et al. | 395/712 |

* cited by examiner

Primary Examiner—Kakali Chaki
(74) Attorney, Agent, or Firm—Christie, Parker & Hale, LLP

(57) ABSTRACT

A personal information device is provided in the form of a PCMCIA card and includes a PCMCIA I/O port that is adapted to be coupled to a PCMCIA port of a computer, a first memory that is directly accessible by the computer via the PCMCIA I/O port, second and third memories that are not directly accessible to the computer, and a controller. When the personal information device is inserted into the computer's PCMCIA port, the first memory directly receives and stores therein reprogramming data supplied by the computer. Immediately after the data is downloaded, or alternatively, upon disconnection of the personal information device from the computer, the personal information device's controller transfers to the second memory reprogramming code included in the reprogramming data stored in the first memory, executes the reprogramming code stored in the second memory, and then programs the third memory by utilizing the application code included in the reprogramming data stored in the first memory in accordance with the reprogramming code being executed. The downloaded application code may include organizer application code for the end user, diagnostic code or other types of code. In addition to being able to interface with a computer via the computer's PCMCIA port, the personal information device may communicate with a computer by using a docking station that includes therein a controller and that is capable of changing the baud rate of data serially supplied thereto so as to allow a computer and a personal information device communicating at different baud rates to serially communicate with one another.

8 Claims, 12 Drawing Sheets

CALENDAR

| | |
|---|---|
| | WEDNESDAY |
| 9:30 | TURNER PRESENTATION |
| 10:30 | CONFERENCE CALL ON FORECAS... |
| 12:00 | MEET WITH SUSAN AND BILL |

1 Dec, 1997 7:22

CARDFILES

| #AB | CDE | FGH | IJK | LMN |
|---|---|---|---|---|
| ACME PRINTING | | | | 215-555-7700 |
| B&B MARKETING | | | | 412-555-3232 |
| DESIGN CONCEPTS | | | | 609-555-1313 |
| ERS REALITY | | | | 704-555-2500 |
| EXECUTIVE RECRUITING | | | | 212-555-6565 |
| MERCURY SOFTWARE | | | | 609-555-6962 |
| SMC PARTNERS | | | | 213-555-4400 |

1 Dec, 1997 7:21

FIG.2C

TO-DO LIST

| TO-DO LIST | TODAY |
|---|---|
| ☐ OVERNIGHT PROPOSAL TO PATI | |
| ☐ BETA UNITS FOR RICH | |
| ☐ SEND MEMO TO PATTI | |
| ☐ GET ARTICLE FROM LARRY | |
| ☐ REVIEW EMAIL FROM BARRY | |
| 🔔 ☐ CALL CAROLYN | |
| 🔔 ☐ CALL LEN | |
| ✏️ 🏠 1 Dec, 1997 7:24 | |

FIG.2D

MEMOS

| TURNER PRESENTATION |
|---|
| TALK POINTS: |
| 1. OBJECTIVE |
| 2. STRATEGY |
| 3. PROGRAM IMPLEMENTATION |
| 4. TIMING |
| 5. STAFFING |
| ✏️ 🏠 1 Dec, 1997 7:25          ⇩ |

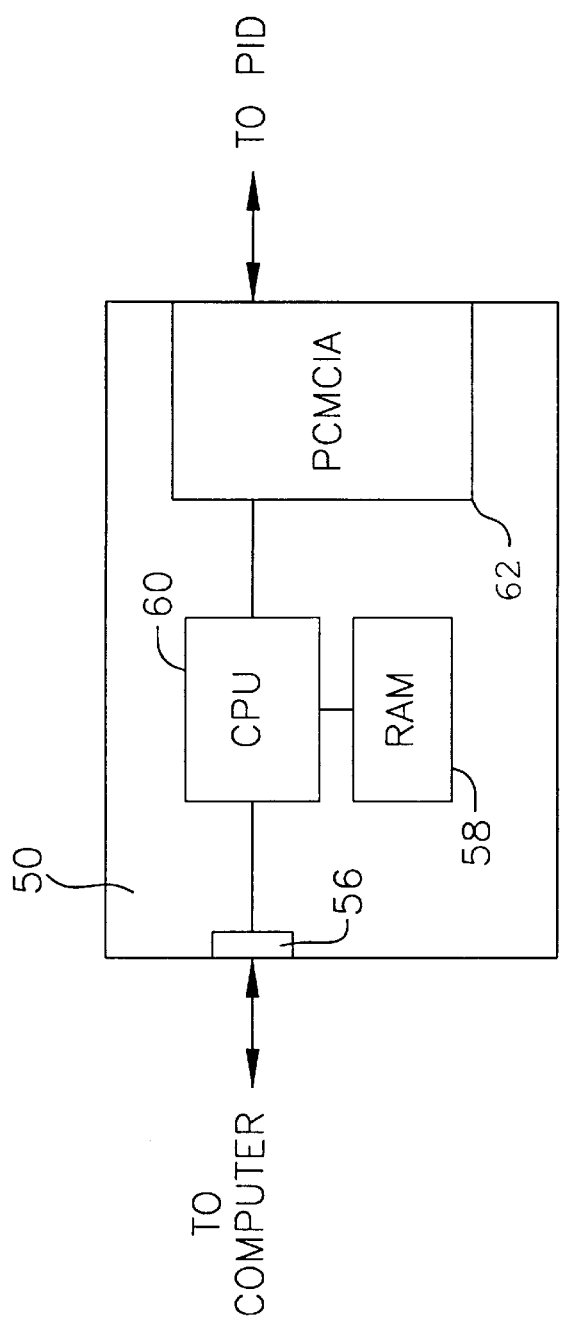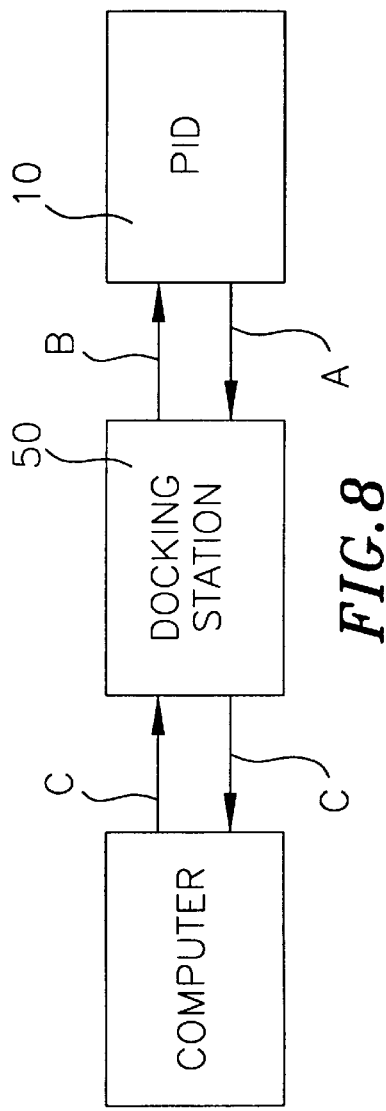
FIG.7
FIG.8

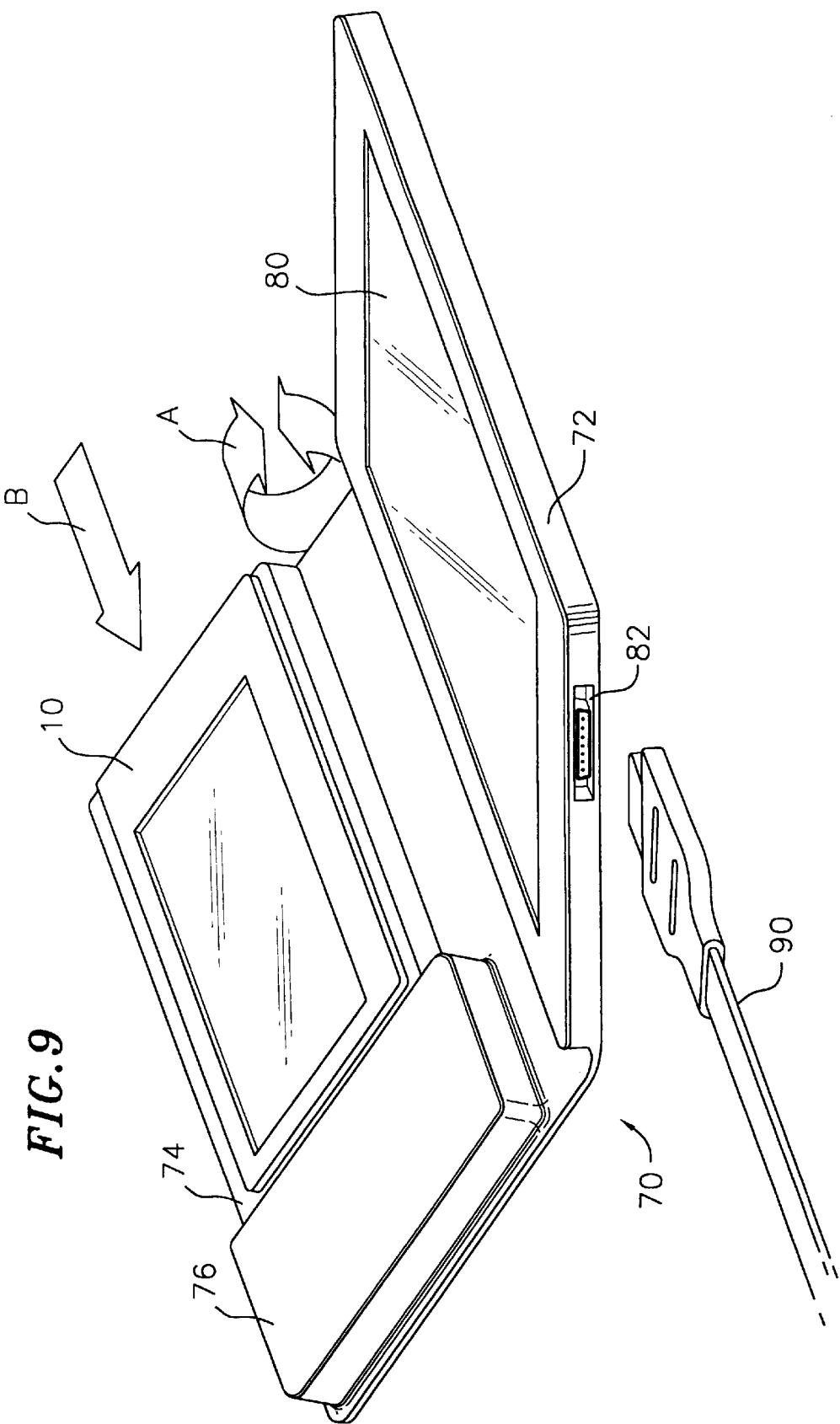

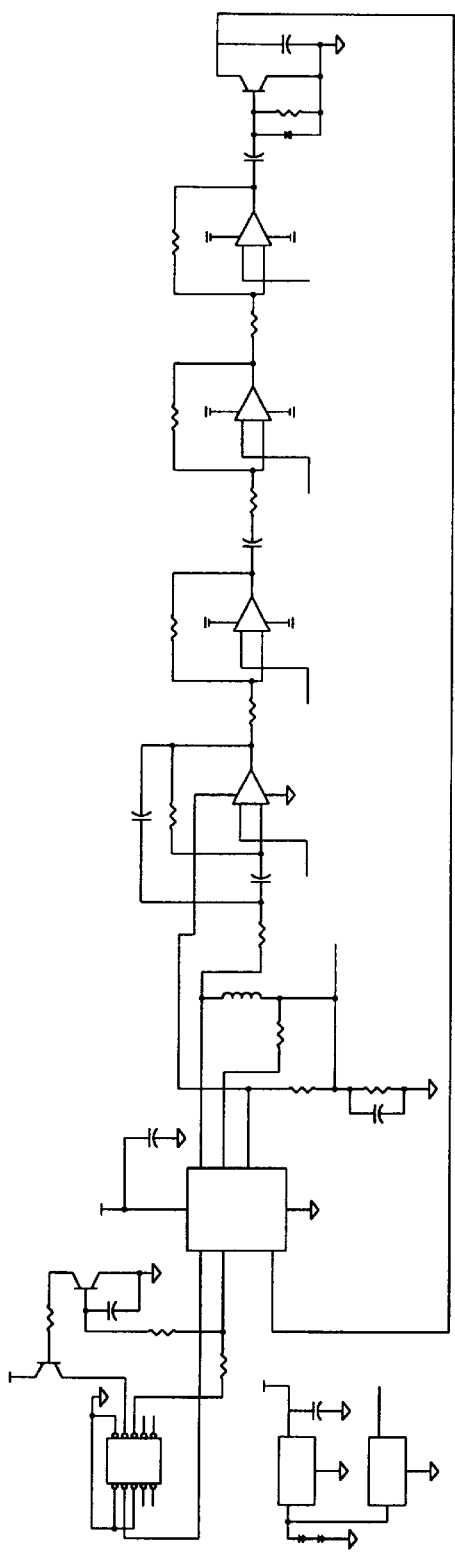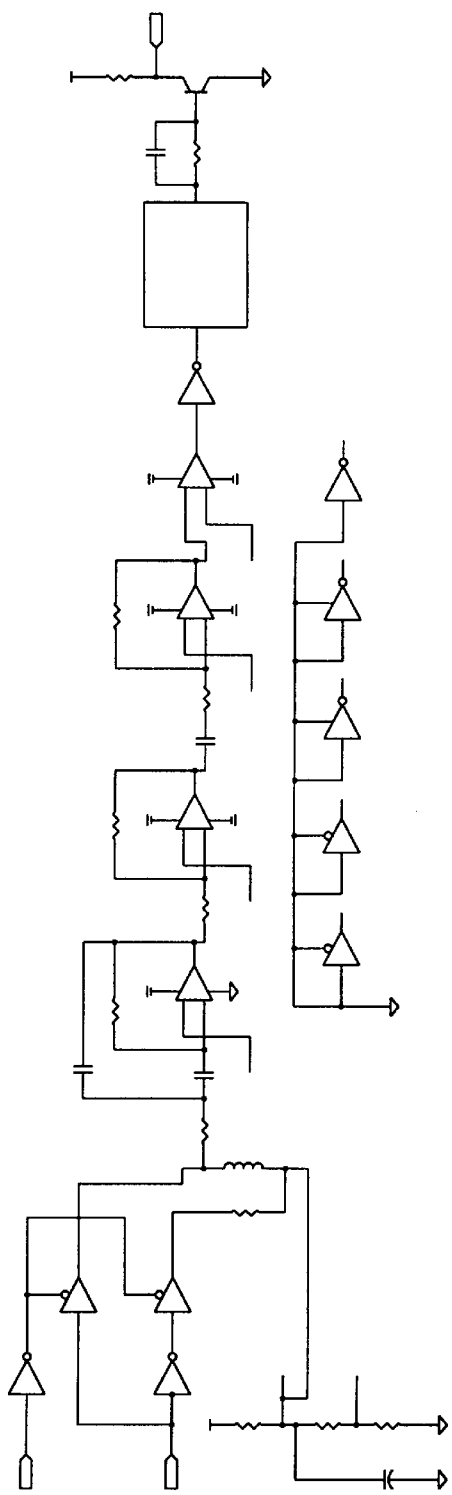
FIG. 12A
FIG. 12B

PERSONAL INFORMATION DEVICE AND METHOD FOR DOWNLOADING REPROGRAMMING DATA FROM A COMPUTER TO THE PERSONAL INFORMATION DEVICE VIA THE PCMCIA PORT OR THROUGH A DOCKING STATION WITH BAUD RATE CONVERSION MEANS

RELATED APPLICATION

This is a continuation-in-part of U.S. patent application Ser. No. 09/189,572, filed Nov. 11, 1998, which is a continuation-in-part of U.S. patent application Ser. No. 09/028,367, filed Feb. 24, 1998, now U.S. Pat. No. 5,978, 591. The disclosures of U.S. patent application Ser. Nos. 09/189,572 and 09/028,367 are incorporated herein by reference.

BACKGROUND OF THE INVENTION

The present invention relates to a personal information device, e.g., an electronic organizer, and method for downloading reprogramming data from a computer to the personal information device and, more particularly, to a microsized device in the form of a PCMCIA card that receives from a computer reprogramming data that is utilized to reprogram the flash memory of the personal information device. The invention also relates to a personal information device in combination with a docking station for coupling the personal information device to a computer's serial port and for converting the baud rate of signals supplied thereto so as to allow a personal information device and a computer communicating at different baud rates to communicate with one another. The present invention further relates to a wallet for a personal information device and, more particularly, to a wallet having a touchpad and, optionally, a PCMCIA connector therein for use in combination with a personal information device.

Recently, there has been a trend to develop and utilize compact and pocket-size electronic devices, such as compact computers (notebook computers), compact electronic personal organizers, compact electronic dictionaries, compact electronic encyclopedias, and so on. As such devices become smaller in size, various problems result, including a reduction in the ease of their operation due to, for example, reduced-sized keys, reduced-sized displays and/or reduced number of keys thereon.

Recent developments have attempted to overcome this problem as well as other problems that are inherent in compact and pocket-sized electronic devices. For example, many compact electronic personal organizers are now equipped to communicate with a personal computer, wherein a user enters various data, e.g., telephone numbers, appointments, etc., into the computer which then transmits or downloads that entered data to the compact electronic personal organizer for storage therein. This technique provides two advantages over previous devices. Data is more easily entered with a full sized keyboard than with a reduced-size keypad. Data is entered only once to utilize organizer programs running on both the personal computer and the compact electronic personal organizer.

While the above-mentioned and other developments have produced more user friendly, easier to use and more sophisticated compact organizers, there still is a need for a personal information device, e.g., an electronic personal organizer, that is yet smaller in size than existing devices and easier to use, and which is designed to allow for easier development of software-driven features therein. There also is a need to provide accessories for use with these personal information devices that make such devices even easier to use.

OBJECTS OF THE INVENTION

Therefore, it is an object of the present invention to provide a micro-sized personal information device which overcomes the short comings of existing devices.

Another object of the present invention is to provide a personal information device that is operable to easily and safely receive data downloaded from a computer attached thereto.

A further object of the present invention is to provide a personal information device that is capable of being coupled to a computer via the computer's PCMCIA port.

An additional object of this invention is to provide a personal information device that is easily reprogrammed to provide additional or different features, e.g., organizer features, to a user.

Still another object of the present invention is to provide an improved method of downloading reprogramming data from a computer to the personal information device.

Still an additional object of this invention is to provide a docking station that allows a personal information device and a computer communicating at different baud rates to communicate with one another.

Various other objects, advantages and features of the present invention will become readily apparent to those of ordinary skill in the art, and the novel features will be particularly pointed out in the appended claims.

SUMMARY OF THE INVENTION

In accordance with the present invention, a personal information device includes a housing in the form of a PCMCIA card, a PCMCIA I/O port at one end of the housing and that is adapted to be coupled to a PCMCIA port of a computer, a first memory coupled to the PCMCIA I/O port and that is directly accessible by the computer via the PCMCIA I/O port when the PCMCIA I/O port of the personal information device is coupled to the computer and a second memory that is not directly accessible to the computer, and a controller. When the computer is coupled to the PCMCIA I/O port of the personal information device, the first memory is adapted to receive and store therein reprogramming data, which includes application code and reprogramming code, that is supplied from the computer. Thereafter, the controller transfers to the second memory the reprogramming code stored in the first memory and executes the reprogramming code stored in the second memory. In addition, a third memory with the device may be programmed utilizing the application code in accordance with the executed reprogramming code.

In accordance with another embodiment of the present invention, a method for downloading reprogramming data from a computer to a personal information device in the form of a PCMCIA card is provided by directly accessing a first memory of the personal information device by the computer via a PCMCIA I/O port of the personal information device when the PCMCIA I/O port of the personal information device is coupled to a PCMCIA port of the computer, storing reprogramming data supplied from the computer in the first memory, the reprogramming data including application code and reprogramming code, transferring to a second memory of the personal information device the reprogramming code stored in the first memory, executing the reprogramming code stored in the second memory, and programming a third memory of the personal information device utilizing the application code in accordance with the executed reprogramming code.

In accordance with a further embodiment of the present invention, a personal information device has a housing in the form of a PCMCIA card, a PCMCIA I/O port at one end of the housing that is adapted to be coupled to a PCMCIA port of a computer, an input device including an edit button within the housing that is accessible by a user for receiving user-supplied information, a memory that receives and stores therein application code and user-supplied information, a flat panel display that displays information to the user, and a controller that operates to execute the application code stored in the memory, to control the flat panel display, and to receive the user-supplied information received by the input device. The controller, when executing the application code, allows the user to enter an edit mode by depressing the edit button, at which time, the user can edit previous user-supplied information stored in the memory.

In accordance with an additional embodiment of the present invention, a docking station and corresponding method are provided for coupling and providing for data communication between a personal information device communicating at a first baud rate and a computer communicating at a second baud rate different from the first baud rate. The docking station includes a PCMCIA port adapted to be coupled to a PCMCIA I/O port of the personal information device, a serial connector adapted to be coupled to an I/O port of the computer, and a controller coupled to the PCMCIA port and the serial connector and operable to supply and receive data to and from the personal information device and the computer via the PCMCIA port and the serial connector. When serial data is to be supplied from the computer to the personal information device, the controller receives a plurality of framed bytes supplied by the computer wherein each bit of each framed byte is received at a respective instruction cycle of the controller, buffers selected ones of the bits of each respective framed byte, adds a bit of predetermined value to each framed byte, and serially supplies to the personal information device via the PCMCIA port each of the bits of a respective framed byte along with the added bit of the respective framed byte, each of the supplied bits of the respective framed byte being supplied at a respective instruction cycle of the controller.

In accordance with yet a further embodiment of the present invention, a personal information device system includes a personal information device in the form of a PCMCIA card and a docking station having a PCMCIA connector adapted to be coupled to the PCMCIA port of the personal information device. The docking station further includes a serial connector adapted to be coupled to an I/O port of a computer and a docking station controller that is coupled to the docking station's PCMCIA connector and serial connector, and that is operable to receive a serial transmission at a first baud rate supplied by the computer and to supply a serial transmission at a second baud rate to the personal information device. The personal information device further includes a memory and a controller that receives the serial transmission supplied from the docking station and stores the data represented in the serial transmission in the memory.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1 is a schematic illustration of personal information device 10 of the present invention;

FIGS. 2A–2I are exemplary displays of the various organizer features of personal information device 10;

FIG. 7 is a block diagram of docking station 50 of the present invention;

FIG. 8 is a schematic illustration of the coupling of personal information device 10 via docking station 50 to a host computer;

FIG. 9 is an exemplary schematic illustration of wallet 70 of the present invention having personal information device 10 inserted therein;

FIGS. 12A and 12B are schematic diagrams of exemplary induction circuits of wallet 70 and personal information device 10.

DETAILED DESCRIPTION OF CERTAIN PREFERRED EMBODIMENTS

The personal information device of the present invention is a micro-sized device that has the form of a PCMCIA card and that includes therein an LCD display screen and navigation buttons. As will be discussed, the personal information device (PID) provides various organizer or other types of features to a user and may be inserted within a PCMCIA port (also identified as a PC-card slot) of a personal computer for downloading of various information from the computer to the personal information device. Also, and as will be discussed, the personal information device may communicate with a personal computer via a docking station. The personal information device of the present invention, as described herein, is an electronic personal organizer having various organizer features and functions and, thus, is also identified herein as an organizer. However, the personal information device of the present invention may embody functions and features that are not considered to be so-called organizer functions and, thus, the present invention is not to be limited to electronic organizers.

Figures 1, 2A, 2B:
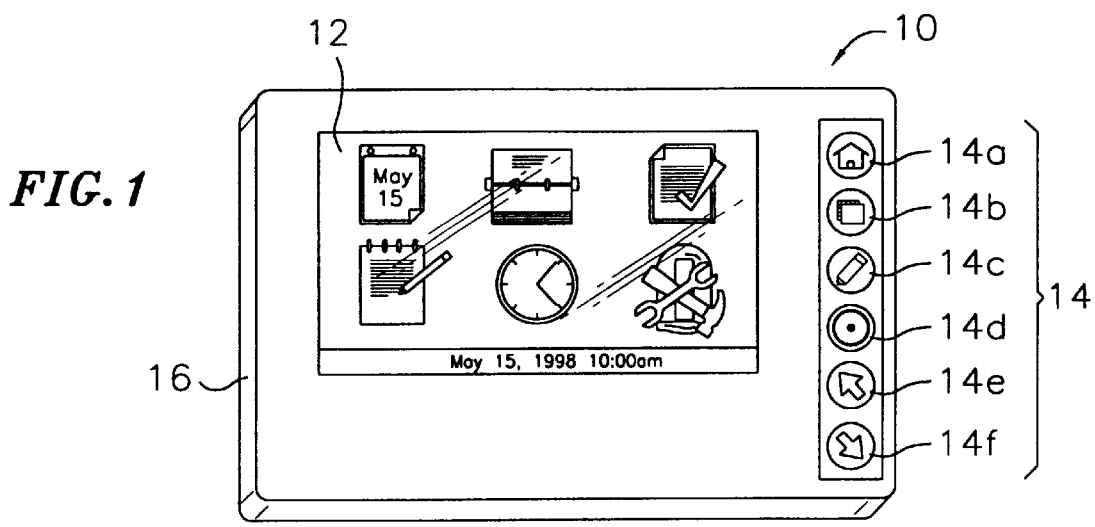

Referring now to the drawings, FIG. 1 is an exemplary illustration of the personal information device 10 of the present invention. As shown, personal information device 10 has a PCMCIA (Personal Computer Memory Card International Association) compatible form factor and includes a flat panel display 12, for example, an LCD display screen, various buttons 14 and a PCMCIA port 16. Display 12 and buttons 14 are within the form factor of the PCMCIA card and, thus, personal information device 10 having such display and buttons may be inserted into the PCMCIA port of a personal computer. During "standard" operation of the personal information device, that is, when the device is not coupled to a computer, various organizer features are provided to a user. For example, and as shown on display 12 of the exemplary illustration of FIG. 1, the various organizer features may be provided in the form of a menu having selectable entries therein. In the exemplary embodiment, the various organizer features of personal information device 10 include a schedule/appointment calender, a telephone directory, a "to do" list, a memo holder, various time clocks and user customization, with each organizer function having a respective icon on the displayed menu. Using the appropriate input buttons 14, the user selects any one of the displayed icons to implement the corresponding organizer feature, and upon selection of an organizer feature, a submenu or other display is provided.

Figure 2E:
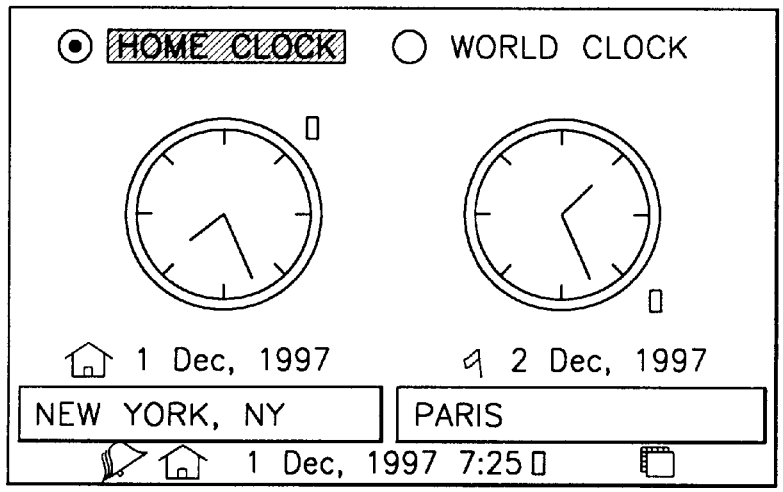
Figure 2F:
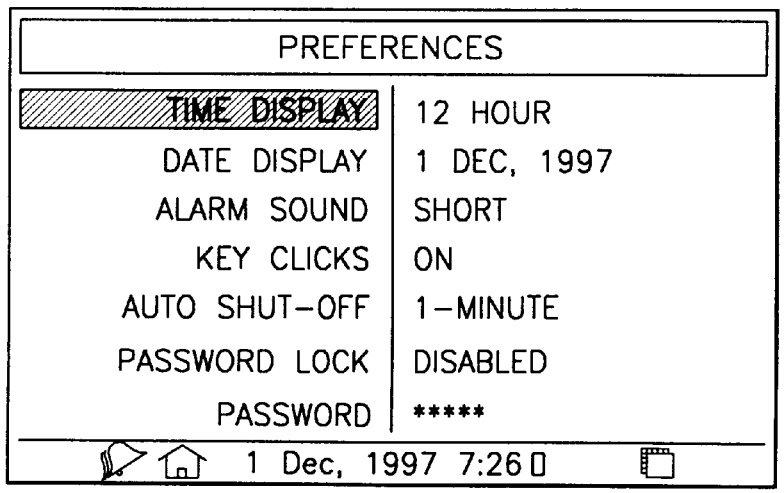

FIGS. 2a–2f are exemplary displays of the six exemplary organizer features that may be selected. FIG. 2a is displayed upon selection of the calendar icon in the main menu of FIG. 1, FIG. 2b is displayed upon selection of the card file (or Rolodex®) icon, FIG. 2c is displayed upon selection of the "to do" list icon, FIG. 2d is displayed upon selection of the memo icon, and FIG. 2e is displayed upon selection of the clock icon. FIG. 2f represents a user customization menu and is displayed upon selection of the toolkit icon.

In accordance with a preferred embodiment of the present invention, and as specifically shown in FIG. 1, buttons 14 includes a main menu or "home" button 14a, a view button 14b, an edit button 14c, a select button 14d, an up/left cursor movement button 14e and a down/right cursor movement button 14f. In general, depression of home button 14a operates to display the "home" screen (FIG. 1), that is, returns the user to the home screen from any other displayed screen. Depression of view button 14b causes a menu of currently available options to be displayed. Depression of edit button 14c causes entry into and exit from the edit mode of the present invention, as further discussed below. Depression of select button 14d operates to select an option. Depression of up/left button 14e or down/right button 14f causes the cursor to move in the appropriate direction. For example, when the home page (FIG. 1) is displayed, the user can press button 14e or 14f until a desired selection is displayed and then press select button 14d, at which time, a particular organizer feature is displayed (e.g., shown in FIGS. 2A–2F).

Figure 2G:
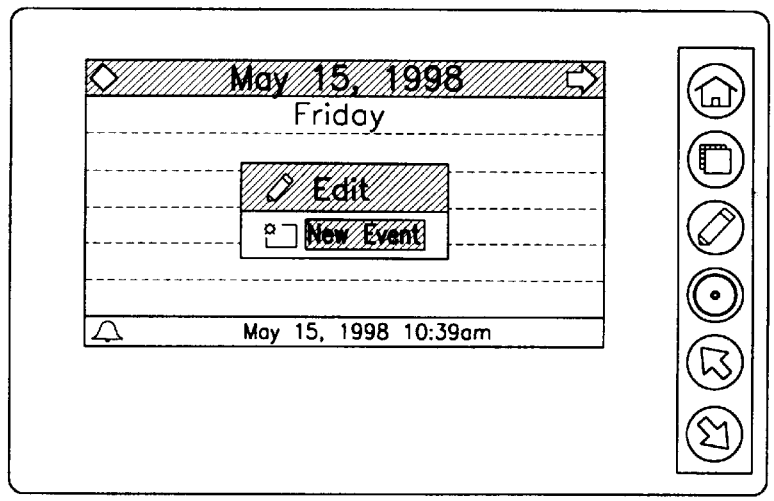
Figure 2H:
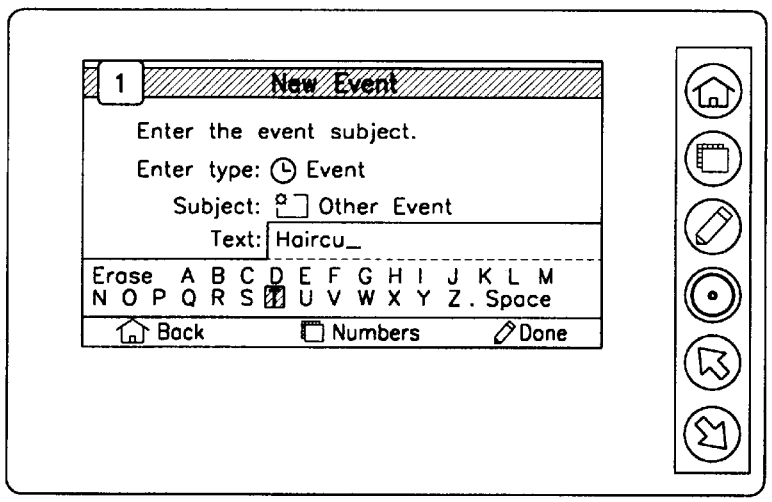

In accordance with the present invention, pressing edit button 14c causes entry into an edit mode in which events, contacts, to do items quicknotes, etc. can be created, deleted or modified. To create a calendar event, the user initially enters the calendar mode (i.e., displays the calendar shown in FIG. 2A) by selecting the calendar shown in the home page of FIG. 1. The user then presses edit button 14c to enter the edit mode at which time a calendar edit menu is displayed, such as shown in FIG. 2G. The user selects (if not already highlighted) the new event option and presses select button 14d. Optionally, another menu then is displayed allowing the user to indicate whether the new event is a recurring event, an all-day event, an annual event, and so on. Then, an entry display is shown, such as shown in FIG. 2H wherein the user utilizes the up/left and down/right buttons 14e, 14f along with select button 14d to enter text and other information to describe the event. Further menus and submenus may also be displayed providing other selections pertinent to the entry of a new event. For example, specific information regarding recurring events, such as days/week, etc., may be requested in submenus. Upon completion of the event, edit button 14c is pressed.

Figure 2I:
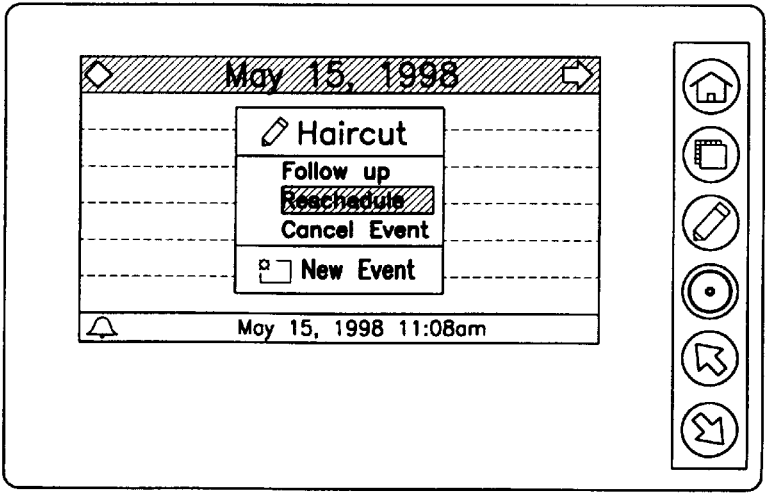

In accordance with the present invention, a previously entered event may be edited (follow-up visit set, revised, rescheduled, canceled, etc.) by first selecting the event to be edited (when displayed within the calendar mode) and then pressing edit button 14c. An edit menu then is displayed, such as shown in FIG. 2I. The desired selection is highlighted utilizing cursor movement buttons 14e, 14f and then selected by pressing select button 14d. Further submenus pertinent to the selected option are provided to allow a follow-up event to be entered, to allow the selected event to be revised in time, description, etc., or to cancel the currently selected event.

The above-discussed ability to edit the calendar feature by allowing entries to be added, edited, updated and canceled utilizing only a few buttons, including an edit button, also is applied to the other organizer features including the telephone directory, the "to do" list," the memo holder, time clocks and user customization. For example, telephone and address entries can be added, edit or deleted by entering the edit mode (e.g., by pressing edit button 14d) while viewing the telephone and address book. Menus and submenus appropriate to the edit mode within the telephone and address entries are similar to those mentioned above, except the requested information is pertinent to telephone and address data.

As previously discussed, a single edit button along with cursor movement buttons and an entry select button allows the user to make entries, revise entries and delete entries without the need to attach the PID of the present invention to a personal computer. Also, edit button 14c of the present invention allows the user to add an entry within a desired organizer function and further allows the user to modify and cancel that entry, as previously described.

The "Reprogramming" Feature

Personal information device 10 also includes, in accordance with the present invention, the capability of receiving "reprogramming" data from a personal computer coupled thereto and reprogramming itself utilizing the downloaded data so as to provide new applications to the user and/or to update the software currently stored in the personal information device. The downloaded applications may include organizer and/or other applications and features for the end-user, as well as diagnostic code that is generally utilized during the production of the application and reprogramming code itself. As will be discussed, the downloading of data and reprogramming of the personal information device of the present invention is herein identified collectively as the "reprogramming" feature of the personal information device.

Figure 3:
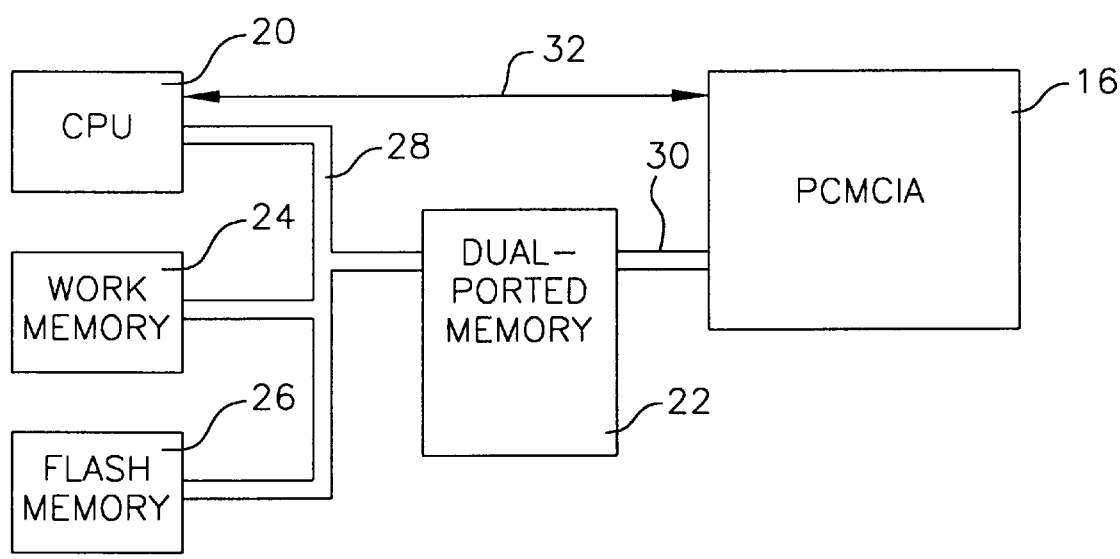
FIG. 3 is a block diagram of personal information device 10 of the present invention.

Referring to the block diagram of personal information device 10 shown in FIG. 3, personal information device 10 includes a processor (CPU) 20, a dual-ported memory 22, a work memory 24, a flash memory 26 and PCMCIA port 16. Although not shown in FIG. 3, personal information device 10 further includes display 12, buttons 14, previously discussed, and a battery for supplying power to the various components. Dual-ported memory 22 is accessible to processor 20 and also to a computer via a bus 30 and PCMCIA port 16 when coupled to personal information device 10. Processor 20 is coupled to work memory 24, flash memory 26 and dual-ported memory 22 via a bus 28. As shown in FIG. 3, work memory 24 and flash memory 26 are not externally accessible. Also, various control signals are provided between processor 20 and the attached computer via lines 32 and PCMCIA port 16.

Personal information device 10 is operable to communicate with a host computer in one of two ways. When the host computer includes a PCMCIA port or slot, and since personal information device 10 is a PCMCIA card, the personal information device may simply be inserted into the computer's PCMCIA port. Insertion of personal information device 10 into the computer's PCMCIA port is identified herein as the direct connection method. If, however, the host computer does not include a PCMCIA port, the docking station of the present invention is utilized to couple personal information device 10 to the computer. As will be discussed, the docking station includes a PCMCIA slot into which personal information device 10 is inserted and a serial connector for connection to the serial port of the computer.

The reprogramming feature of the present invention is carried out in three stages, a downloading stage, an installation stage and a reprogramming stage, and is discussed below with the assumption that the host computer includes a PCMCIA slot into which personal information device 10 is inserted. The first or downloading stage involves the downloading of code from a computer to the personal information device. When personal information device 10 is inserted into the PCMCIA port of a host computer and when appropriate application code in the computer is executed, application and reprogramming code is downloaded to dual-ported memory 22 under the control of the host computer. The application code, the reprogramming code and a special data string, which is used to facilitate the installation stage, are stored in dual-ported memory 22. The application code, reprogramming code and special data string are collectively identified as the reprogramming data. The second or installation stage involves the transferring to work memory 24 of the reprogramming code contained in the reprogramming data stored in dual-ported memory 22. The programming code is transferred so that processor 20 can safely execute it. The final or reprogramming stage involves the execution of the programming code stored in work memory 20 which, in turn, programs flash memory 26, as discussed below. Upon completion of the reprogramming stage, the reprogramming code passes execution to the newly installed application code in the flash memory.

The Downloading Stage

During the downloading stage, the reprogramming data is downloaded from the attached host computer and stored in dual-ported memory 22. In the direct connection method, that is, when personal information device 10 is inserted into the PCMCIA port of the host computer, the host computer addresses dual-ported memory 22 as it would during normal communications with personal information device 10 and stores the reprogramming data in dual-ported memory 22.

When a docking station is used, serial communication device driver software within processor 20 utilizes several pins of PCMCIA connector 16 as serial communications lines, and using an established protocol, the driver stores the reprogramming data (serially transmitted, discussed below) in dual-ported memory 22.

Figure 4:
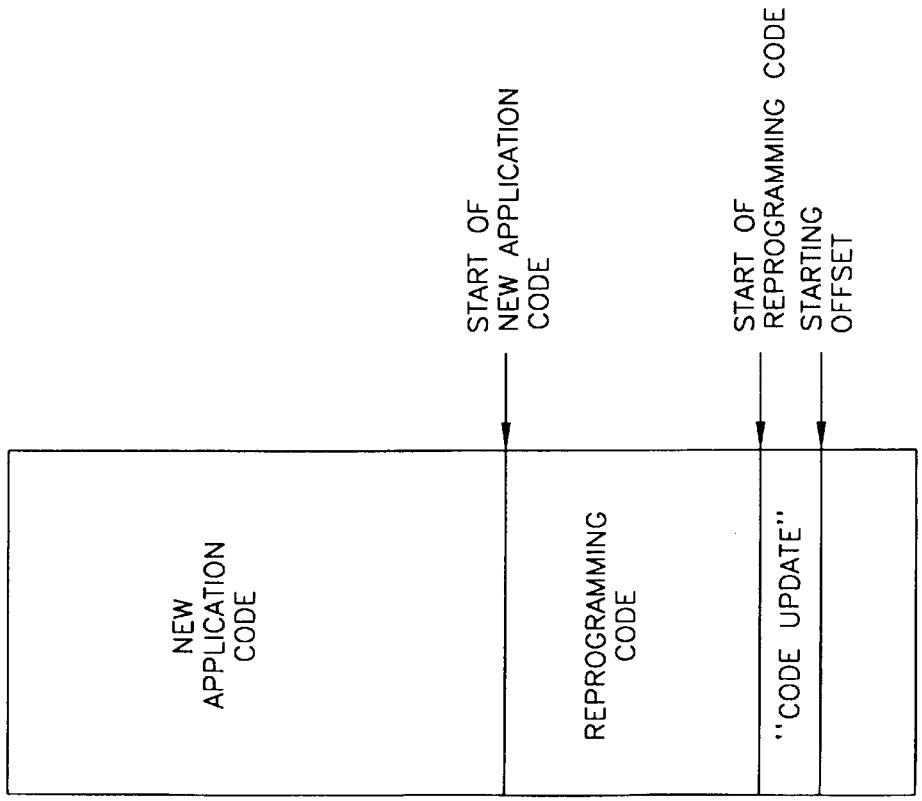
FIG. 4 is a data structure of dual-ported memory 22 in accordance with the present invention.

In accordance with the present invention, the reprogramming data is stored at the address locations in dual-ported memory 22 in the manner shown in FIG. 4. As shown, a "Code Update" string of the reprogramming data is stored at a pre-defined address location, the reprogramming code is stored at another pre-defined address location following (or not pre-defined location but immediately following) the code update string, and the new application code (also called flash application code) to be installed into flash memory 26 is stored at a further pre-defined address location following (or not pre-defined location but immediately following) the reprogramming code. As previously mentioned, the code update string (special data string) identifies that the data stored in dual-ported memory 22 is for reprogramming of flash memory 26 and is utilized during the installation stage.

Figure 5:
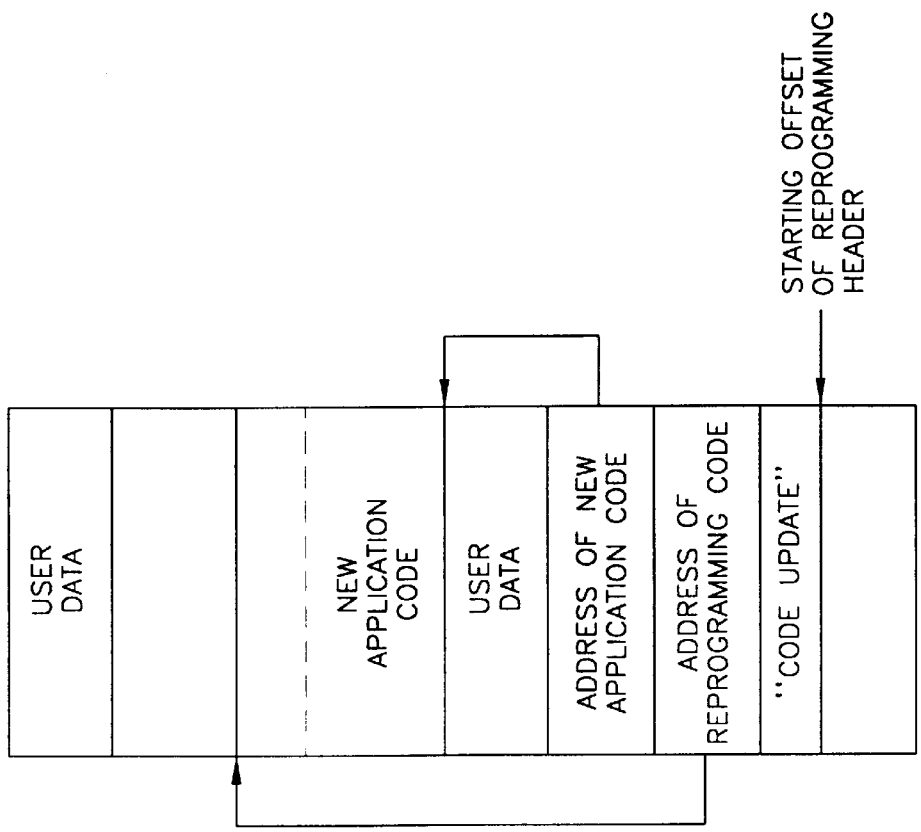
FIG. 5 is a data structure of dual-ported memory 22 in accordance with another embodiment of the present invention.

While a particular data structure of dual-ported memory 22 is shown in FIG. 4, other structures are possible. For example, FIG. 5 discloses a structure wherein a reprogramming header stored at a pre-defined address location identifies the address locations at which the reprogramming data and the new application code are stored. In this structure, greater flexibility is achieved by utilizing (e.g., during downloading) only that memory of dual-ported memory 22 that is necessary. For example, user data that is stored in dual-ported memory 22 (prior to the initiation of the reprogramming feature) may be retained (i.e., not overwritten during the downloading stage) for future use by the application software.

Still yet other data structures are possible. For example, the reprogramming and application code may be stored in blocks throughout the memory instead of in contiguous memory. In this instance, dual-ported memory 22 is divided into blocks of pre-defined size with each block beginning with a respective block header. Also, the fragmented code in dual-ported memory 22 can be referenced by an expanded reprogramming header or by a scan of each block header for a special string.

The Installation Stage

When the reprogramming data is stored in dual-ported memory 22, the installation stage begins wherein the reprogramming code is transferred by processor 20 to work memory 24. As previously mentioned, work memory 24 is not accessible via PCMCIA connector 16. Thus, work memory 24 is protected from subsequent downloading of data (write operations) by the host computer thereby providing the desired result that the reprogramming code stored in work memory 24 cannot be overwritten by the host computer during its execution.

In accordance with the preferred embodiment of the present invention, the installation stage does not begin until personal information device 10 card is removed from the computer's PCMCIA slot. The disconnection of personal information device from the host computer causes an interrupt to processor 20 (via lines 32) which, in turn, initiates a routine within processor 20 that controls processor 20 to determine if reprogramming data has been newly downloaded into dual-ported memory 22. If the "Code Update" string is stored at the predefined address within dual-ported memory 22, processor 20 transfers (installs) the reprogramming data stored in dual-ported memory 22 to work memory 24, at which time, the installation stage is complete.

In an alternative embodiment of the present invention, processor 20 periodically polls dual-ported memory 22 to determine if reprogramming data is newly downloaded, for example, by polling for the "Code Update" string. Upon determination that new reprogramming data has been downloaded, processor 20 transfers the new reprogramming data to work memory 24. In this embodiment, installation of reprogramming data into work memory 24 and the subsequent programming of the flash memory (in the next stage) can occur while personal information device 10 is still coupled to the host computer.

The Reprogramming Stage

Upon installation of the reprogramming data into work memory 24, processor 20 passes execution to the reprogramming code stored in work memory 24 to begin the reprogramming stage. The reprogramming code, also called the reprogramming application, carries out a multi-step process of first diagnosing the new application code stored in dual-ported memory 22, then erasing flash memory 26, and finally programming flash memory 26 with the new application code stored in dual-ported memory 22.

Initially, the reprogramming application ascertains the integrity of the newly downloaded application code. This may be achieved in any number of ways including, for example, performing a checksum of the application code. Other diagnostic techniques are well known in the art and therefore are not discussed herein. If the reprogramming application ascertains errors in the application code, it may attempt to correct those errors if the application code also includes appropriate error correction code. If the application code is faulted and not correctable, then the reprogramming feature of personal information device 10 terminates thus preserving the older application code stored in flash memory 26. In an alternative embodiment, the diagnostic step is skipped.

In addition to diagnosing the newly downloaded application code, the status of the power source (i.e., battery) is verified to determine if the power source can provide enough power for the personal information device to erase flash memory 26 and subsequently reprogram flash 20 memory 26 (discussed below). If the power source measures below a predetermined threshold, then it is likely that the reprogramming feature cannot be performed to completion and, thus, the reprogramming feature is terminated at this point (i.e., before the flash memory is erased) thereby preserving the older application code stored in flash memory 26.

The reprogramming application carries out an erasing operation of flash memory 26. However, since the programming algorithm and program/erase block size that are utilized to erase a flash memory is dependent on the type of flash device that is included within personal information device 10, the reprogramming code controls processor 20 to query flash memory 26 for a device ID stored therein. Upon ascertaining the device ID of flash memory 26, the reprogramming application proceeds with the erasing of the flash memory. Since the procedures for erasing various types of flash memories are well known in the art, further description thereof is not provided herein. Alternatively, an auto-erase type flash memory may be utilized thus obviating the need for the reprogramming application to carry out a separate erase function.

When flash memory 26 is fully erased (alternatively, partially erased), controller 20 programs flash memory 26 by transferring thereto the application code stored in dual-ported memory 22. Once flash memory 26 is programmed with the new application code, the reprogramming feature of personal information device 10 is complete, at which time, processor 20 passes execution to the newly installed flash code. In the presently discussed embodiment, the newly installed flash code generally will represent user organizer features including, for example, telephone/address book, memos, and so on. Of course, the flash code may be diagnostic code that is useful for the development of organizer functions and/or other types of functions.

The above-described reprogramming feature is carried out, as previously discussed, by inserting personal information device 10 within the PCMCIA port of a personal computer, downloading reprogramming data from the computer to dual-ported memory 22 of personal information device 10, removing personal information device 10 from the computer's PCMCIA port, transferring the reprogramming code within the downloaded data to work memory 24, executing the reprogramming code within work memory 24 which, in tun, re-programs flash memory 26 with the downloaded application code stored in the dual-ported memory, and upon completion of reprogramming flash memory 26, passing execution to the application code stored in flash memory 26.

In accordance with another embodiment of the present invention, the above-listed "steps", except the last step of passing execution to the application code, is considered to be a single "pass" wherein a multiple number of "passes" are required to fully reprogram the flash memory. In this embodiment, flash memory 26 may be rather large in size relative to the size of dual-ported memory 22, wherein each "pass" causes a different portion of flash memory 26 to be programmed.

When personal information device 10 is inserted into the PCMCIA port of host personal computer, a partial amount of reprogramming data (also identified as a first set of reprogramming data) is downloaded from the computer to dual-ported memory 22. The downloaded first set of reprogramming data includes "first" reprogramming code and "first" application code. Personal information device 10 then is removed from the PCMCIA port of the host computer, at which time, the "first" reprogramming code is transferred to work memory 24. The "first" reprogramming code stored in work memory 24 is executed which, in turn, causes flash memory 26 to be partially reprogrammed (and erased, if necessary) with the "first" application code stored in dual-ported memory 22. The completion of this "first" reprogramming of flash memory 26 is said to complete the first pass.

After the first pass, a second pass is initiated when the user reinserts personal information device 10 into the PCMCIA port of the same host computer, at which point, a second set of reprogramming data (including a second reprogramming code and a second application code) is downloaded from the computer to dual-ported memory 22. Personal information device 10 then is again removed from the PCMCIA port of the host computer, at which time, the second reprogramming code is transferred to work memory 24 and executed which causes flash memory 26 to be again partially reprogrammed (and erased, if necessary) with the second application code stored in dual-ported memory 22. If necessary, third, fourth and even more passes may be carried out if necessary. Upon completion of all the necessary passes, execution is passed to the application code stored in flash memory 26.

In the above-discussed "multiple pass" embodiment of the present invention, flash memory 26 is large in size relative to the other memory components within personal information device 10. By providing for multiple reprogramming passes, it is possible to reprogram a large memory (i.e., the flash memory) utilizing a smaller dual-ported memory as well as a smaller work memory.

The Docking Station

Figure 6:
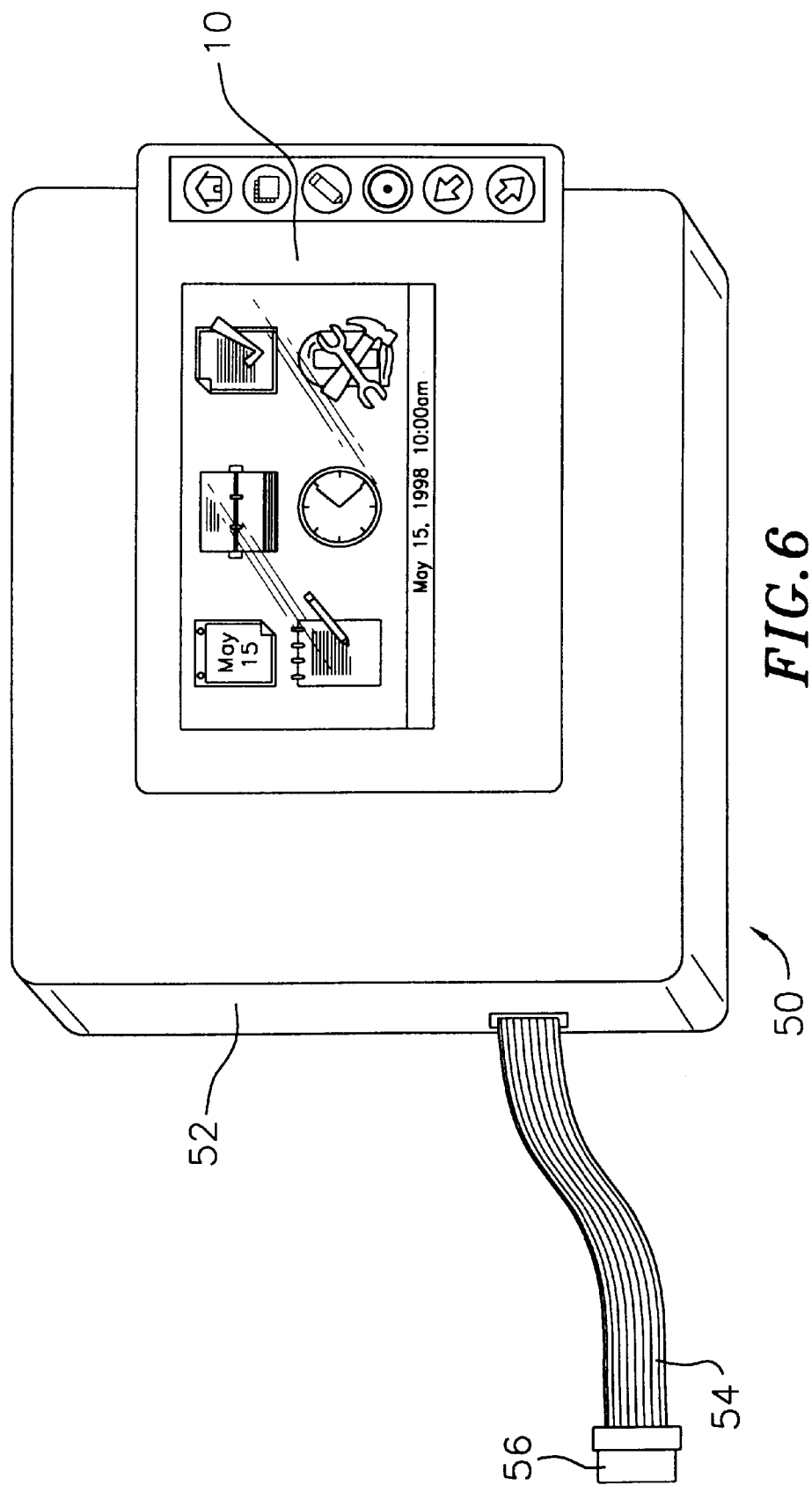
FIG. 6 is a schematic illustration of docking station 50 having personal information device 10 coupled thereto in accordance with the present invention.

In accordance with the present invention, personal information device 10 may connect to a host computer via a docking station. FIG. 6 is a schematic illustration of a docking station 50 having personal information device 10 coupled thereto. Generally, docking station 50 is utilized when the host computer does not include a PCMCIA port. As shown in FIG. 6, docking station 50 includes a main body 52, a cable 54 and a serial connector 56 attached to the end of cable 54. Body 52 of the docking station is shaped in such a manner so that personal information device 10 may be slidable therein. Docking station 50 also includes a PCMCIA connector 62 (hidden in FIG. 6) to which PCMCIA connector 16 of personal information device 10 may be coupled.

During its use, docking station 50 receives personal information device 10 in the manner shown in FIG. 6 and is coupled to the host computer's serial port via serial connector 56. In another embodiment, docking station includes an appropriate connector, in place of serial connector 56, that is adapted to couple to the host computer's parallel port or to another I/O port of the computer. Referring to the block diagram of FIG. 7, docking station 50 includes serial connector 56, PCMCIA connector 62, a buffer memory (RAM) 58 and a processor (CPU) 60. Alternatively, the buffer memory may be contained within processor 60 itself.

Processor 60 (alternatively, memory 58) includes stored therein docking station executable code for carrying out the baud rate conversion of the present invention. The executable code, also identified herein as the baud rate conversion program or code, provides for a fast and effective transfer rate between personal information device 10 and the host computer. In the preferred embodiment, the baud rate conversation program carries out the fastest serial transfer rate that is possible between the personal information device and the host computer. Generally, the personal information device of the present invention is capable of faster serial communication than typical personal computers. For example, the personal information device may have a baud rate of 67.1875K baud while typical personal computers have a fastest baud rate of 57.6K baud. However, these numbers generally will go up with further developments and cheaper equipment. Even so, it is desirable for the personal information device 10 to be able to interface with any type of personal computer and, thus, the baud rate conversion program of the present invention allows for such interfacing. Without baud rate conversion, the host computer and personal information device would have to communicate at the highest common baud rate of, for example, 9600 baud.

The docking station in combination with the personal information device and the host computer may operate in a first mode in which baud rate conversion is carried out in docking station 50, or in a second mode in which baud rate conversion is not carried out and the host computer and the personal information device are "instructed" to communicate at their highest common baud rate. The application software being executed by the host computer may determine in which of these modes the devices are to operate. In such case, to select the "slow" speed mode (i.e., no baud rate conversion), the host computer transmits a zero byte at 19.2K baud (or less), and to select the "fast" speed mode, the host computer transmits a "FF" at its fast speed of, for example, 57.6K baud. In the slow speed mode, the serially transmitted data simply passes through docking station 50 (i.e., processor 60 simply provides the received serial data as an output). In the fast speed mode, docking station 50 carries out baud rate conversion in the manner discussed below.

When docking station 50 carries out baud rate conversion in accordance with the present invention, communication between docking station 50 and personal information device 10 of the present invention is always carried out at the personal information device's fastest communication speed of, for example, 67.1875K baud (hereinafter 67.2K), and communication between docking station 50 and the host computer is carried out at the computer's fastest communication speed (or a suitably high speed to facilitate the present invention) of, for example, 57.6K baud. Thus, and referring to FIG. 8, when data is transmitted from personal information device 10 to the host computer, data is first sent from personal information device 10 to docking station 50 at the baud rate "A" of 67.2K baud, and then transmitted from docking station 50 to the host computer at the baud rate "C" of 57.6K baud. For transmissions originating from the computer, data is transmitted from the computer to docking station 50 at the baud rate "C" of 57.6K baud and then transmitted from docking station 50 to personal information device 10 at the baud rate "B" of 67.2K baud. While the "A" and "B" baud rates are the same, communication to docking station 50 from personal information device 10 is distinguished from communication to personal information device 10 from docking station 50 because the bit structure of the transmitted data is different therebetween, as discussed below.

In accordance with the present invention, processor 60 of docking station 50 (in accordance with the baud rate conversion program) "counts" instruction cycle times of the individual instructions being executed within the baud rate conversion program and, at the proper times, inputs and\or outputs bits to\from personal information device 10 and the host computer. That is, each bit of each "framed byte" transmitted\received by docking station 50 follows a previously transmitted\received bit by a predetermined amount of time since both the transmitting and receiving baud rates are known, and since the amount of time for an instruction cycle within processor 60 is known, the time at which a bit is transmitted or received is definable in terms of instruction cycles. In the given example, to maintain the 57.6K baud rate, a bit must be transmitted or received every 17.36 instruction cycles (for the particular oscillator utilized by processor 60), and to maintain the 67.1875K baud rate, a bit must be transmitted or received every 14.9 instructions cycles. As discussed herein, a "framed byte" generally includes data bits (e.g., 8 data bits) and other bits to facilitate serial communication (e.g., start, parity and stop bits).

In accordance with the present invention, Table 1 shown below provides a docking station input/output (receipt/transmission) schedule of each bit of a respective framed byte that originates from personal information device 10 and that is supplied to the host computer. Moreover, to facilitate proper baud rate conversion of data supplied to docking station 50 at the 67.1875K baud rate from personal information device 10 to the slower 57.6K baud rate of data transmitted from docking station 50 to the host computer, personal information device 10 transmits for each framed byte an additional two bits (an additional parity bit and an additional stop bit) that are subsequently not utilized by docking station 50 and thus not transmitted to the host computer. Additional bits are transmitted from personal information device 10 to docking station 50 so as to effectively slow down the overall byte transfer rate. In the present embodiment, 12 bits are transmitted at the 67.1875K baud rate by personal information device 10 and include: a start bit, 8 data bits, a parity bit and 2 stop bits. The Docking station, in turn, transmits to the host computer 10 bits: a start bit, 8 data bits and a stop bit.

TABLE I

Personal Information Device to Computer-Input/Output Schedule

| Instruction Cycle | Receive from PID 10 | Transmit to Computer |
|---|---|---|
| 7 | receive start bit | |
| 9 | | send start bit |
| 22 | receive data bit 0 (15) | |
| 26 | | send data bit 0 (17) |
| 37 | receive data bit 1 (15) | |
| 44 | | send data bit 1 (18) |
| 52 | receive data bit 2 (15) | |
| 61 | | send data bit 2 (17) |

TABLE I-continued

Personal Information Device to Computer-Input/Output Schedule

| Instruction Cycle | Receive from PID 10 | Transmit to Computer |
|---|---|---|
| 67 | receive data bit 3 (15) | |
| 78 | | send data bit 3 (17) |
| 82 | receive data bit 4 (15) | |
| 96 | | send data bit 4 (18) |
| 97 | receive data bit 5 (15) | |
| 112 | | send data bit 5 (16) |
| 113 | receive data bit 6 (16) | |
| 127 | receive data bit 7 (14) | |
| 131 | | send data bit 6 (19) |
| dnc | receive parity bit (dnc) | |
| 148 | | send data bit 7 (17) |
| dnc | receive 1st stop bit (dnc) | |
| 165 | | send stop bit (17) |
| dnc | receive 2nd stop bit (dnc) | | dnc: do not care

Referring to Table 1, a start bit is received from personal information device 10 at instruction cycle 7 which, in turn, causes a start bit to be transmitted to the computer at instruction cycle 9. Processor 60 of the docking station then polls its serial input port at instruction cycle 22 to receive data bit 0, and docking station 50 transmits data bit 0 to the computer at instruction cycle 26. The number of cycles that have passed from the previous input/output is shown in parenthesis in Table 1. As shown, there are between 14 to 16 cycles between the occurrence of two successive inputs from personal information device 10, which reflects the 14.9 instruction cycles per bit at the 67.2K baud rate, and there are between 16 to 19 cycles between the occurrence of two successive outputs to the host computer, which reflects the 17.36 instruction cycles per bit at the 57.6K baud rate. Furthermore, Table 1 does not identify the instruction cycles at which the parity and 2 stop bits are received primarily since the times of reception of these bits are unimportant to the times at which bits are output to the computer. Finally, received data bits are temporally buffered within docking station 50 when necessary so that they may be supplied out at the appropriate instruction cycle.

When data is transmitted from the host computer via docking station 50 to personal information device 10, the baud rate of the transmitted data is increased from the computer's transmission baud rate of 57.6K baud to the personal information device's reception baud rate of 67.1875K baud. In accordance with the present invention, Table 2 shown below provides a docking station input/output (receipt/transmission) schedule of each bit that originates from the host computer and that is supplied to personal information device 10. In addition, to facilitate a proper decrease in baud rate, docking station 50 adds an additional bit to each framed byte supplied by the host computer. In the present embodiment, the host computer supplies to the docking station 10 bits: a start bit, 8 data bits and a stop bit, which 10 bits have the same structure as the 10 bits supplied to the host computer during personal information device to computer communication, discussed above. The docking station transmits to the personal information device 11 bits: a start bit, 8 data bits, a parity (set) bit and a stop bit. The parity bit in the preferred embodiment is simply a set bit, but may be a reset bit or an actual parity bit.

TABLE II

Computer to Personal Information Device-Input/Output Schedule

| Instruction Cycle | Receive from Computer | Transmit to PID 10 |
|---|---|---|
| 4–11 | receive start bit | |
| 26 | receive data bit 0 | |
| 32 | | send start bit |
| 43 | receive data bit 1 (17) | |
| 47 | | send data bit 0 (15) |
| 61 | | send data bit 1 (14) |
| 62 | receive data bit 2 (19) | |
| 77 | | send data bit 2 (16) |
| 78 | receive data bit 3 (16) | |
| 92 | | send data bit 3 (15) |
| 95 | receive data bit 4 (17) | |
| 106 | | send data bit 4 (14) |
| 113 | receive data bit 5 (18) | |
| 121 | | send data bit 5 (15) |
| 130 | receive data bit 6 (17) | |
| 136 | | send data bit 6 (15) |
| 148 | receive data bit 7 (18) | |
| 151 | | send data bit 7 (15) |
| 165 | receive stop (17) | |
| 167 | | send parity (set) (16) |

Referring to Table 2, a start bit is received from the host computer sometime between instruction cycle 4 and 11, and then data bit 0 is receive at instruction cycle 26. The data bit is buffered and a start bit is transmitted to personal information device 10 at instruction cycle 32. Data bits 1–7 and the stop bit are received by docking station 50 at the instruction cycles indicated in the table, and data bits 0–7 are transmitted from docking station 50 to personal information device 10 at the instruction cycles indicated. Finally, a parity (set) bit is supplied to personal information device 10 at instruction cycle 167, and thereafter a stop bit is transmitted to personal information device 10. In the preferred embodiment, the values of the parity and stop bits are the same and, thus, the output remains the same to supply the stop bit after the parity (set) bit.

The docking station of the present invention, as discussed above, uses instruction cycles to determine when bits are to be input or output to a connected device. In an alternative embodiment of the present invention, a timer is utilized wherein the baud rate conversion program provides for receiving or outputting a respective bit at a time that is a function of the timer value and the baud rate at which the data is input or output. If the timer is reset after receiving/outputting each bit, then the timer value itself identifies the passage of time after reception/transmission of the previously input/output bit. If the timer is not reset, then bits are received/output at predetermined timer values. One or more timers may be utilized. In one embodiment, a first timer is provided for received bits and a second timer is utilized for output bits.

As discussed above, the personal information device of the present invention, whether or not used in combination with the docking station of the present invention, includes therein the capability of re-programming its own flash memory with new/revised application code. The reprogramming feature of the present invention provides for safe reprogramming by utilizing a separate work memory that is not accessible to the host computer for reprogramming purposes and by providing a mechanism for verifying that newly downloaded application code is error free prior to the reprogramming of the flash memory. In addition, the PCMCIA card design of the personal information device is perfectly suited for mobile use but with advantageously powerful organizer capability. The personal information device's reprogramming feature further provides for easier development of application code. Finally, the docking station of the present invention allows the personal information device to interface with a host computer that does not include therein a PCMCIA port, and further provides the advantageous feature of allowing the host computer to communicate with the personal information device at its fastest baud rate.

The Wallet

In accordance with the present invention, a flexible wallet, e.g., a leather wallet, may be used in combination with the above-described personal information device, as well as with other similar types of devices. FIG. 9 is an exemplary schematic illustration of wallet 70 having personal information device 10 inserted therein. As shown, wallet 70 includes bottom and top halves 72, 74 (or left, right halves, etc.) that may be opened/closed (represented by arrows "A") in a "wallet" like manner. Bottom half 72 includes a touchpad 80 and optionally may include a serial connector 82 to which a cable 90 may be coupled (to be discussed). Top half 74 may include a device holder 76 that operates to hold a personal information device when inserted therein in the direction shown by arrow "B". Alternatively, the device holder may be a strap or other suitable device that holds the personal information device in place.

Figure 10:
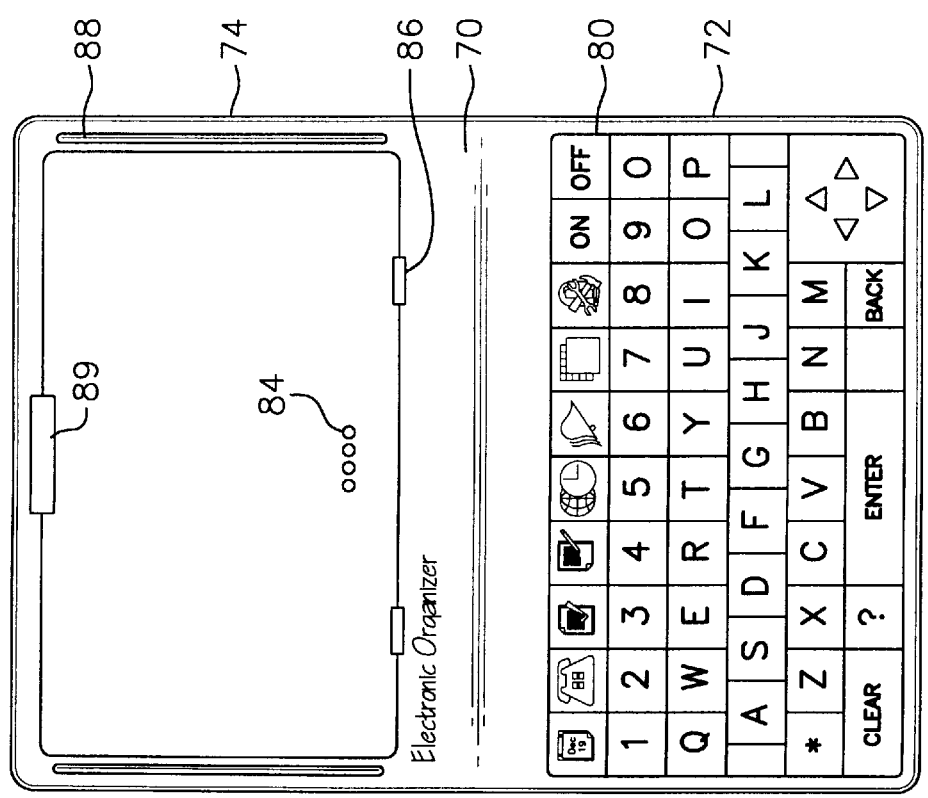
FIG. 10 is another illustration of wallet 70 of the present invention.

Referring to FIG. 10, which illustrates wallet 70 without the personal information device coupled thereto, top half 74 of wallet 70 includes contact pins 84 which operate to make contact with appropriate opposing surfaces on the back of personal information device 10 for electrical connection thereto. Contact pins 84 are electrically connected to touchpad 80 and operate as the input/output terminal of touchpad 80. In one embodiment of the present invention, and as will be discussed, personal information device 10 via contact pins 84 provides a source of power to touchpad 80. Contact pins 84 also function as an output to personal information device 10 by supplying a signal thereto that represents the user input on touchpad 80.

Wallet 70 further includes hooks 86 that assist in holding device 10 once inserted, guiders 88 that operate to guide device 10 into wallet 70 for proper insertion therein, and a snap 89 that maintains wallet 70 in its closed position (with bottom and top halves 72, 74 touching).

Figure 11:
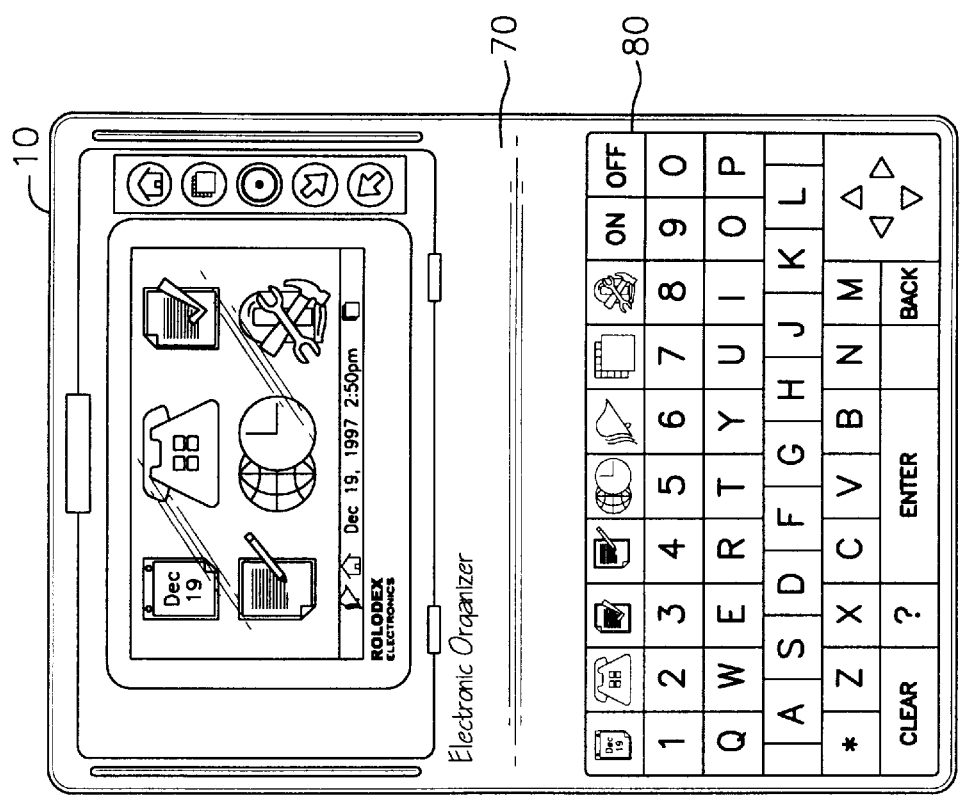
FIG. 11 is a further illustration of wallet 70 having personal information device 10 inserted therein.

When personal information device 10 is inserted within wallet 70, such as shown in both FIGS. 9 and 11, both the display and the input buttons of device 10 are readable\accessible to the user, and wallet 70 operates to allow a user to input data and other information into device 10 in a number of ways. In operation, personal information device 10 detects when it is coupled to wallet 70 in any appropriate fashion, for example, by polling its electrical surfaces (that are intended to make contact with contact pins 84) for input thereto, by means of an interrupt, or other method that is known in the art. When connection to wallet 70 is detected, personal information device 10 generally provides to the user all of the functions and features that are provided when not connected to wallet 70, but further provides various additional features including, for example, those features that are provided to the user via the host computer, as previously discussed. Such features include telephone/address book entries, note entries, appointment entries, and so on.

In a preferred embodiment of the present invention, contact pins 84 as well as opposing electrical surfaces on the personal information device are not utilized and, instead, communication between wallet 70 and personal information device 10 is carried out by the use of electro-magnetic induction. Communication via electromagnetic induction is contactless and, thus, external components are unnecessary for wallet 70 to provide data to personal information device 10 and for personal information device 10 to provide data to wallet 70. In this preferred embodiment, one coil (not shown) is provided within the personal information device and one coil (also not shown) is provided, for example, on a rigid board such as a small PC board within the top half 74 of the wallet. The PC board within the top half of the wallet may include the necessary circuitry to couple the wallet's coil to touchpad 80.

As is appreciated, communication between wallet 70 and personal information device 10 via electromagnetic induction provides various advantages over hard-wired or electrically coupled communication (e.g., via pins 84). Pins are susceptible to wear and breakage, and communication between the devices is prone to errors when the metal surfaces are not clean. Moreover, exposed electrical contacts often present an electro-static discharge (ESD) problem and generally require that there be a tight physical and aligned connection between the devices to ensure proper contact.

When wallet 70 and personal information device 10 are designed to communicate via electro-magnetic induction, and not by direct electrical contact, wallet 70 requires its own power source (e.g., battery). In accordance with the present invention, the input device (i.e., touchpad 80) of wallet 70) remains "off" (i.e., essentially unpowered), so as to maximize battery life, unless an attached personal information device is on. Wallet 70 is "on" (i.e., the input device of the wallet is powered) when the attached personal information device is on. To "wake up" wallet 70, personal information device 10 sends a so-called "wake" signal which is, for example, a burst on a 10 KHz carrier signal, via the induction coils to the wallet. When the circuitry within wallet 70 detects the 10 KHz signal, touchpad 80 is automatically turned on. In a preferred embodiment, the personal information device is designed to send a so-called "stay awake" signal periodically (e.g., every 5 seconds, every 30 seconds, every 60 seconds, etc.) and wallet 70 is designed to remain awake if the stay awake signal is received periodically. If wallet 70 doesn't receive the stay awake signal within a predetermined time period, the input device (i.e., the touchpad) of wallet 70 is de-powered. In this instance, battery life of the wallet is preserved if the personal information device is turned off or if the personal information device is removed from wallet 70. Once turned on, wallet 70 transfers data serially to personal information device 10 using, for example, bursts on an 80 KHz carrier. The received signal is converted within personal information device 10 to the appropriate data.

FIGS. 12A and 12B schematically illustrate exemplary circuits that can be utilized within wallet 70 and personal information device 10, respectively. The touchpad 80 hardware may be coupled to a small microcomputer to drive the wallet's coil, and in order to wake the wallet (i.e., touchpad 80), a bandpass filter (alternatively, a microcontroller) filters out all but the 10 KHz signal used by the personal information device to signal that it is on. Within personal information device 10, circuitry to drive device 10's induction coil to signal that device 10 is on may be built into the ASIC of the personal information device. Also circuitry is built into the ASIC to convert the 80 KHz signal into serial data. A bandpass filter is utilized to filter out all but the 80 KHz signal. Since the particular operations of the circuits shown in FIGS. 12A and 12B are known to one of ordinary skill in the art, a detailed description of the operation of these exemplary circuits is omitted herein. Of course, other known, appropriate circuits may be utilized.

Figure 13:
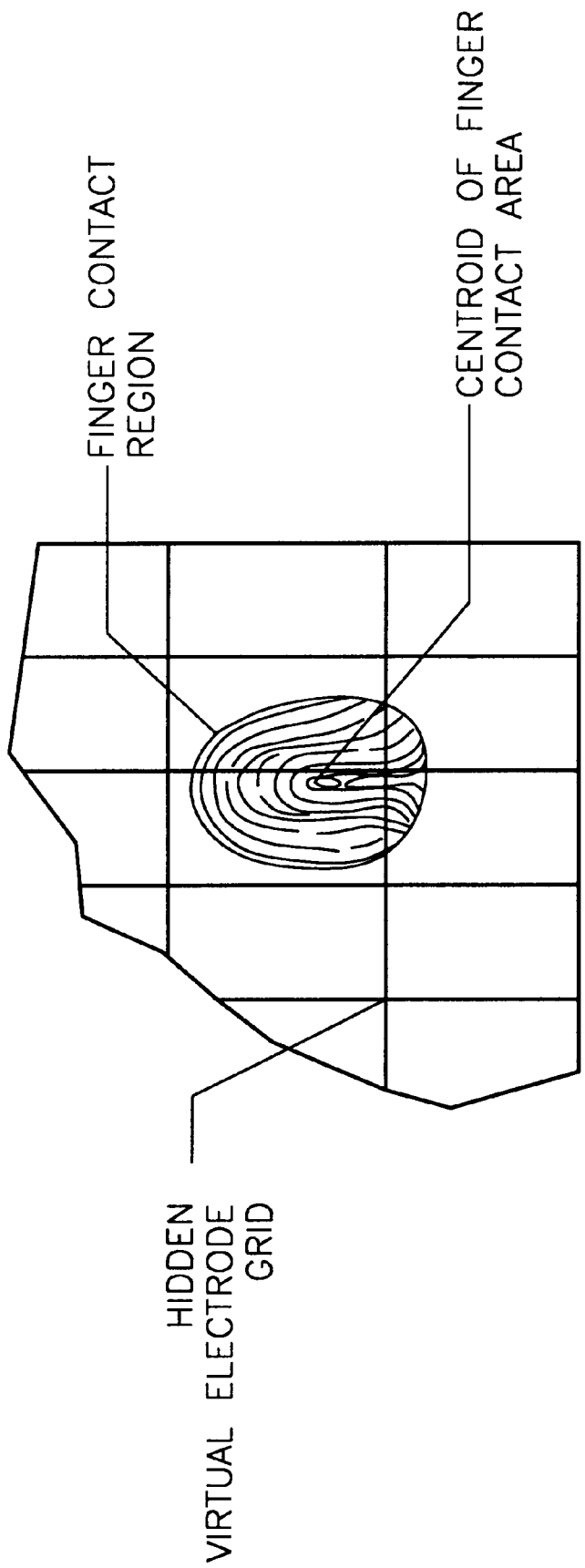
FIG. 13 schematically illustrates the operation of the touch-pad of wallet 70 of the present invention.

In accordance with an embodiment of wallet 70 of the present invention, touchpad 80 is silk-screened with a complete keyboard, such as shown in FIGS. 10 and 11, and thus all entries that can be made via a computer keyboard can be made via the keyboard on touchpad 80. Touchpad 80 may be a pressure-sensitive type display. However, in the preferred embodiment of the present invention, touchpad 80 is a Cirque GlidePoint® touchpad which is based on electrical capacitance and which does not require pressure or direct contact. Such touchpad contains a two-layer grid of electrodes which are connected to an integrated circuit mounted on the reverse side of the touchpad, the first (upper) layer containing vertical electrode strips and the second (lower) layer containing horizontal electrical strips. Mutual capacitance from each of the horizontal electrodes to each of the vertical electrodes, and which is modified by the presence of a human finger, is measured by the touchpad's integrated circuit. FIG. 13 schematically illustrates the operation of the touchpad. Upon detection of the human finger, touchpad 80 supplies as an output (via contacts 84 or electro-magnetic induction) the coordinates of the finger position and the personal information device identifies the selected key as a function of the supplied coordinates. Alternatively, touchpad 80 supplies as an output a signal representing a data value that identifies the selected key (e.g., 1="A", 2="B", etc.).

In the presently discussed embodiment, wallet 70 advantageously allows a user to enter all necessary information into personal information device 10 without the need for a host computer. As shown in FIGS. 9–11, wallet 70 is compact and conforms to the shape of personal information device 10 thus allowing one to easily utilize wallet 70 in combination with personal information device 10 at all times.

In accordance with another embodiment of the present invention, touchpad 80 is replaced with a touch-sensitive (pressure sensitive or alternatively, non-pressure sensitive) display that is operable to display an image (display) thereon in accordance with a signal(s) (i.e., data) supplied from personal information device 10 thereto via contact pins 84 or electromagnetic induction. In this embodiment, the display on the touch-sensitive display varies in accordance with the user-selected function to facilitate ease of use of that particular function. For example, upon user selection of the appointment schedule feature, personal information device 10 supplies to wallet 70 an appropriate signal (i.e., data) so that a calendar is displayed by the touch-sensitive display of wallet 70 and the user simply selects (i.e., touches) that day/date at which an appointment is to be scheduled. Upon selection of the desired day/date, the display of wallet 70 may then be controlled by personal information device 10 to display different times of the day (e.g., 9 a.m, 10 a.m., etc.) for selection by the user. Flat panel display 12 of personal information device 10 may, during each step mentioned above, provide instructions to the user as well as any other information to facilitate ease of use of the device. Wallet 70 may include a buffer memory for storing therein the display data supplied from personal information device 10. Alternatively, the memory within wallet 70 may be a non-volatile memory having pre-stored therein data pertaining to plural displays and thus the display data mentioned above that is supplied from personal information device 10 may simply identify which of the pre-stored displays wallet 70 is to provide to the user.

In accordance with a further embodiment of wallet 70 of the present invention, touchpad 80 provides for user input via drawing with a finger or stylus (i.e., "inking"). The drawn input, representing, for example, a memo or note, may be stored as a graphic within personal information device 10. Alternatively, personal information device 10 includes appropriate recognition software that converts the drawn information into text data that is then stored in memory.

In accordance with yet another embodiment of wallet 70 of the present invention, top half 74 of wallet 70 includes a PCMCIA connector, for example, within holder 76 shown in FIG. 9, to which the PCMCIA connector of personal information device 10 may be directly coupled. In this embodiment, wallet 70 generally will not require contact pins 84 or electromagnetic induction technology. The various power and data signals are supplied via the respective PCMCIA connectors of wallet 70 and personal information device 10. The operation of wallet 70 having a PCMCIA connector may be similar to those embodiments previously discussed.

Referring back to FIG. 9, and as previously mentioned, wallet 70 may include a serial connector 82 to which a cable 90 may be coupled for the purpose of interfacing personal information device 10, when inserted into wallet 70, to a host computer. Cable 90 may include attached thereto a serial connector or other type of connector, (not shown) that may be connected to the serial or other port of the host computer. Cable 90 may even be attached to a PCMCIA card that can be inserted into the PCMCIA port of the host computer. Still further, cable 90 may be attached to a device that functions in a manner similar to that of docking station 50, previously discussed, to carry out baud rate conversion. When wallet 70 has inserted therein personal information device 10 and is also coupled to a host computer, for example, via cable 90, any and all of the previously discussed features may be performed, including the downloading of reprogramming data from the host computer to personal information device 10 and/or the downloading of user-entered data (e.g., appointment information, address/telephone information, etc.). In addition, the added capability of uploading data from personal information device 10 may be provided since personal information device may include information therein that is entered thereto via wallet 70 and that is not reflected in the host computer.

In accordance with another embodiment of the present invention, serial connector 82 of wallet 70 may be coupled via cable 90 (or other suitable cable) to any one of a number of peripheral devices including, for example, a modem, a facsimile machine, another personal information device, embodying the present invention and so on. The application code within personal information device 10 inserted within wallet 70 provides the appropriate signals to the attached peripheral device.

While the present invention has been particularly shown and described in conjunction with preferred embodiments thereof it will be readily appreciated by those of ordinary skill in the art that various changes may be made without departing from the spirit and scope of the invention. For example, although the present discussion is directed to a device to be used as a micro-sized personal organizer, the present invention is not limited solely thereto and may applied to devices that perform other functions. Various other devices include pagers, mobile telephones, electronic maps, safety devices, classroom training devices, etc., as well as other devices that may be incorporated within a PCMCIA card or other equivalent and which may be interfaced with a personal computer for downloading of application code and reprogramming code thereto.

As another example, although the present discussion is directed to a personal information device in the form of a PCMCIA card, other physical formats may be utilized such as floppy disks, compact disks, magnetic cards, smart cards, etc.

As a further example, although specific baud rates of communication have been discussed herein, the docking station of the present invention may be utilized to provide for conversion of serially transmitted and received data at other baud rates.

As an additional example, although the discussion of the wallet herein is specifically shown with a particular shape and size into which the above-described personal information device may be inserted, the disclosed wallet may be designed to accept devices of other shapes and sizes, as well as devices that carry out different functions than those mentioned herein.

As yet another example, although the wallet of the present invention has been described as having a particular shape and size, e.g., a two-fold wallet, the wallet may be of a different shape and size (e.g., a three-fold type wallet, a wallet with folds along perpendicular axes, etc.).

Therefore, it is intended that the appended claims be interpreted as including the embodiments described herein, the alternatives mentioned above, and all equivalents thereto.

What is claimed is:

1. A personal information device comprising:
   a housing in the form of a PCMCIA card;
   a PCMCIA I/O port at one end of the housing and adapted to be coupled to a PCMCIA port of a computer;
   a first memory in said housing and coupled to said PCMCIA I/O port, said first memory being directly accessible by the computer via the PCMCIA I/O port when the PCMCIA I/O port of the personal information device is coupled to the computer, said first memory being adapted to receive and store therein reprogramming data having reprogramming code and application code therein supplied from the computer;
   a second memory in said housing, said second memory not being directly accessible to the computer;
   a controller coupled to said first and second memories, said controller being operable to transfer to said second memory the reprogramming code from said first memory, and execute the reprogramming code in said second memory; and
   a third memory in said housing;
   wherein said controller further operates to program the third memory utilizing the application code stored in the first memory with the application code being under the control of the executed reprogramming code stored in the second memory;
   said personal information device further comprising an input device within the housing and accessible by a user for receiving user-supplied information and a flat panel display within or on said housing and visible to said user for displaying information thereto, said input device including at least an edit button;
   and wherein said controller is operable to execute the application code programmed into the third memory and, when the application code is being executed, the controller is responsive to the user-supplied information received by said input device and is operable to control said flat panel display in accordance with the executed application code, and when the edit button is pressed while the application code is being executed, the controller is operable to enter an edit mode wherein a user-supplied entry can be added to, revised or removed from the personal information device.

2. A method of downloading reprogramming data from a computer to a personal information device in the form of a PCMCIA card, comprising the steps of:
   directly accessing a first memory of the personal information device by a computer via a PCMCIA I/O port of the personal information device when the PCMCIA I/O port of the personal information device is coupled to a PCMCIA port of the computer;
   storing reprogramming data supplied from the computer in the first memory, the reprogramming data including reprogramming code and application code;
   transferring to a second memory of the personal information device the reprogramming code stored in the first memory; and
   executing the reprogramming code stored in the second memory;
   programming a third memory utilizing the application code stored in the first memory with the application code being under the control of the executed reprogramming code stored in the second memory;
   receiving user information supplied by a user directly to an input device including an edit button of the personal information device;
   displaying information on a flat panel display of the personal information device that is visible to the user;
   executing the application code programmed into the third memory;
   responding to user depression of the edit button by entering an edit mode in accordance with the application code;
   receiving user supplied information in accordance with the edit mode; and
   controlling the information displayed on the flat panel display in accordance with the edit mode.

3. A personal information device comprising:
   a housing in the form of a PCMCIA card;
   a PCMCIA I/O port at one end of the housing and adapted to be coupled to a PCMCIA port of a computer;
   an input device within the housing and accessible by a user for receiving user-supplied information, said input device including an edit button;
   a memory in said housing adapted to receive and store therein application code and said user-supplied information;
   a flat panel display within or on said housing and visible to said user for displaying information thereto; and
   a controller coupled to said memory, said controller being operable to execute the application code stored in said memory, to control the flat panel display, and to receive the user-supplied information received by said input device, said controller, when executing the application code, being adapted to enter an edit mode upon user depression of the edit button, and said controller, when in said edit mode, being adapted to edit the user-supplied information stored in the memory in response to other user-supplied information received by the input device;
   wherein said memory is comprised of first and second memories, said first memory being directly accessible by the computer via the PCMCIA I/O port when the PCMCIA I/O port of the personal information device is coupled to the computer, said first memory being adapted to receive and store therein reprogramming data having reprogramming code therein supplied from the computer, said second memory not being directly accessible to the computer;

and said controller being adapted to transfer to the second memory the reprogramming code stored in the first memory only after the personal information device is disconnected from the computer.

4. A docking station coupling and providing data communication between a personal information device communicating at a first baud rate and a computer communicating at a second baud rate different from said first baud rate, comprising:

a PCMCIA port adapted to be coupled to a PCMCIA I/O port of said personal information device;

a serial connector adapted to be coupled to an I/O port of said computer; and a controller coupled to said PCMCIA port and said serial connector and operable to supply and receive data to and from said personal information device and said computer via said PCMCIA port and said serial connector, said controller, when serial data is to be supplied from one of said computer and said personal information device to the other of said computer and said personal information device, receives a plurality of framed bytes supplied by said one of said computer and said personal information device, each of said plurality of framed bytes includes a respective plurality of bits wherein said controller is configured with a predetermined routine having instructions and executes the predetermined routine, such that the controller counts instruction cycles that correspond to the instructions of the executed predetermined routine, such that said controller buffers at least one of the plurality of bits of each respective framed byte based on the counted instruction cycles;

adds at least one bit to each of said framed bytes based on the counted instruction cycles, and serially supplies to said other of said computer and said personal information device each of said plurality of bits of a respective framed byte along with the added at least one bit of the respective framed byte at a specific counted instruction cycle.

5. A docking station for coupling and providing data communication between a personal information device communicating at a first baud rate and a computer communicating at a second baud rate different from said first baud rate, comprising:

a PCMCIA port adapted to be coupled to a PCMCIA I/O port of said personal information device;

a serial connector adapted to be coupled to an I/O port of said computer; and a controller coupled to said PCMCIA port and said serial connector and operable to supply and receive data to and from said personal information device and said computer via said PCMCIA port and said serial connector, said controller, when serial data is to be supplied from one of said computer and said personal information device to the other of said computer and said personal information device, receives a plurality of framed bytes supplied by said one of said computer and said personal information device, each of said plurality of framed bytes includes a respective plurality of bits;

wherein said controller includes at least one timer, the at least one timer identifies time intervals, the time intervals being a function of time and one of the first baud rate and the second baud rate, such that said controller buffers at least one of the plurality of bits of each respective framed byte based on the identified time intervals;

adds at least one bit to each of said framed bytes based on the identified time intervals, and serially supplies to said other of said computer and said personal information device each of said plurality of bits of a respective framed byte along with the added at least one bit of the respective framed byte at a specific identified time interval.

6. A method of providing for data communication between a personal information device communicating at a first baud rate and a computer communicating at a second baud rate different from said first baud rate, comprising the steps of;

counting instruction cycles that correspond to instructions of a predetermined routine;

receiving serially supplied data from one of said personal information device and said computer, the received data including a plurality of framed bytes, each of said plurality of framed bytes including a respective plurality of bits, and each of said bits of a respective framed byte being received at a specific counted instruction cycle;

buffering at least one of the plurality of bits of each respective framed byte based on the counted instruction cycles;

adding at least one bit to each of said framed bytes based on the counted instruction cycles; and serially supplying to the other of said personal information device and said computer each of said plurality of bits of a respective framed byte along with the added at least one bit of the respective framed byte at a specific counted instruction cycle.

7. A method of providing for data communication between a personal information device communicating at a first baud rate and a computer communicating at a second baud rate different from said first baud rate, comprising the steps of:

identifying time intervals, the time intervals being a function of time and one of the first baud rate and the second baud rate;

receiving serially supplied data from one of said personal information device and said computer, the received data including a plurality of framed bytes, each of said plurality of framed bytes including a respective plurality of bits, and each of said bits of a respective framed byte being received at a specific identified time interval;

buffering at least one of the plurality of bits of each respective framed byte based on the identified time intervals;

adding at least one bit to each of said framed bytes based on the identified time intervals; and serially supplying to the other of said personal information device and said computer each of said plurality of bits of a respective framed byte along with the added at least one bit of the respective framed byte at a specific identified time interval.

8. A personal information device system, comprising:

a personal information device in the form of a PCMCIA card;

a PCMCIA I/O port at one end of the personal information device;

a docking station having a PCMCIA connector adapted to be coupled to said PCMCIA port of said personal information device, and a serial connector adapted to be coupled to an I/O port of a computer;

a docking station controller in said docking station and coupled to said docking station's PCMCIA connector and serial connector, said docking station controller by using one of a timer configured to identify time intervals and a counter configured to count instruction cycles is operable to receive a serial transmission at a first baud rate supplied by a computer coupled to the serial connector of said docking station, and to supply a serial transmission at a second baud rate to said personal information device coupled to said PCMCIA connector of said docking station, said first and second baud rates being different;

a memory in said personal information device; and a personal information device controller in said personal information device, said personal information device controller being coupled to said memory and to said PCMCIA I/O port of said personal information device, said personal information device controller being operable to receive the serial transmission supplied from said docking station and to store data represented in said serial transmission in said memory.

* * * * *